(12) United States Patent
Brath (10) Patent No.: US 9,062,653 B2
(45) Date of Patent: Jun. 23, 2015

(54) CHANGING A MODE OF OPERATION OF A WIND TURBINE

(75) Inventor: Per Brath, Randers Nv (DK)

(73) Assignee: Vestas Wind Systems A/S, Aarhus N (DK)

( * ) Notice: Subject to any disclaimer, the term of this patent is extended or adjusted under 35 U.S.C. 154(b) by 38 days.

(21) Appl. No.: 13/818,589

(22) PCT Filed: Aug. 19, 2011

(86) PCT No.: PCT/DK2011/050315
§ 371 (c)(1),
(2), (4) Date: May 8, 2013

(87) PCT Pub. No.: WO2012/025121
PCT Pub. Date: Mar. 1, 2012

(65) Prior Publication Data
US 2013/0214535 A1    Aug. 22, 2013

Related U.S. Application Data

(60) Provisional application No. 61/376,080, filed on Aug. 23, 2010.

(30) Foreign Application Priority Data

Aug. 23, 2010  (DK) ................................. 2010 00741

(51) Int. Cl.
*F03D 9/00* (2006.01)
*H02P 9/04* (2006.01)
(Continued)

(52) U.S. Cl.
CPC .............. *F03D 7/0264* (2013.01); *F03D 7/042* (2013.01); *F03D 11/0091* (2013.01); *F05B 2260/84* (2013.01); *F05B 2260/845* (2013.01); *Y02E 10/722* (2013.01); *Y02E 10/723* (2013.01)

(58) Field of Classification Search
USPC ...................................................... 290/44, 55
See application file for complete search history.

(56) References Cited

U.S. PATENT DOCUMENTS 4,161,658 A  *  7/1979  Patrick ............................ 290/44
4,454,556 A  *  6/1984  DePuy ............................ 361/73
(Continued)

FOREIGN PATENT DOCUMENTS

| EP | 1918581 A2 | 5/2008 |
|---|---|---|
| WO | 2009109467 A2 | 9/2009 |
| WO | 2009109655 A1 | 9/2009 |

OTHER PUBLICATIONS

International Search Report and Written Opinion dated Apr. 16, 2012 for Application No. PCT/DK2011/050315, 10 pages.
(Continued)

*Primary Examiner* — Pedro J Cuevas
(74) *Attorney, Agent, or Firm* — Patterson & Sheridan, LLP (57) ABSTRACT

A method of operating a wind turbine has the following steps: receiving (13) multiple sensor signals being indicative of the state of the wind turbine (19); analyzing (14) the multiple sensor signals in order to determine whether a specific alarm condition is met as predefined in one of a plurality of different predefined alarm scenarios (30); further analyzing (15) at least one of the multiple sensor signals in accordance with analyzing steps as predefined in the alarm scenario (30) for which the specific alarm condition is met in order to determine (16) whether the wind turbine (19) is to be put into either a predefined safe mode, a shutdown mode or a continued operation mode.

23 Claims, 3 Drawing Sheets

(51) Int. Cl.
*F03D 7/02* (2006.01)
*F03D 7/04* (2006.01)
*F03D 11/00* (2006.01)

(56) References Cited

U.S. PATENT DOCUMENTS

| | | | | |
|---|---|---|---|---|
| 4,600,962 | A * | 7/1986 | Bliehall | 361/77 |
| 4,724,391 | A * | 2/1988 | Blahous | 324/424 |
| 4,994,684 | A * | 2/1991 | Lauw et al. | 290/52 |
| 5,099,145 | A * | 3/1992 | Higasa et al. | 307/140 |
| 5,155,375 | A * | 10/1992 | Holley | 290/44 |
| 7,372,174 | B2 * | 5/2008 | Jones et al. | 290/44 |
| 7,420,288 | B2 * | 9/2008 | Calley | 290/44 |
| 7,511,385 | B2 * | 3/2009 | Jones et al. | 290/43 |
| 7,573,146 | B2 * | 8/2009 | Calley | 290/44 |
| 7,656,052 | B2 * | 2/2010 | Jones et al. | 290/43 |
| 7,692,321 | B2 * | 4/2010 | Jones et al. | 290/43 |
| 7,755,209 | B2 * | 7/2010 | Jones et al. | 290/44 |
| 7,780,412 | B2 * | 8/2010 | Zang et al. | 416/1 |
| 8,154,142 | B2 * | 4/2012 | Nies | 290/44 |
| 8,188,610 | B2 * | 5/2012 | Scholte-Wassink | 290/44 |
| 8,247,914 | B2 * | 8/2012 | Calley | 290/44 |
| 8,655,495 | B2 * | 2/2014 | Garcia | 700/287 |
| 8,733,164 | B2 * | 5/2014 | Olesen | 73/170.06 |
| 8,805,595 | B2 * | 8/2014 | Menke et al. | 700/287 |
| 8,817,438 | B2 * | 8/2014 | Witte | 361/62 |
| 8,861,154 | B2 * | 10/2014 | Witte | 361/71 |
| 8,872,372 | B2 * | 10/2014 | Larsen et al. | 290/44 |
| 2002/0133304 | A1 * | 9/2002 | McClure et al. | 702/58 |
| 2007/0108771 | A1 * | 5/2007 | Jones et al. | 290/44 |
| 2007/0121354 | A1 * | 5/2007 | Jones et al. | 363/47 |
| 2007/0170724 | A1 * | 7/2007 | Calley | 290/44 |
| 2007/0183885 | A1 | 8/2007 | Ormel et al. | 415/4.1 |
| 2009/0021022 | A1 * | 1/2009 | Calley | 290/55 |
| 2009/0146426 | A1 * | 6/2009 | Jones et al. | 290/44 |
| 2009/0146500 | A1 * | 6/2009 | Jones et al. | 307/82 |
| 2009/0147549 | A1 * | 6/2009 | Jones et al. | 363/37 |
| 2009/0187282 | A1 * | 7/2009 | Menke et al. | 700/287 |
| 2009/0193894 | A1 | 8/2009 | Kabatzke | 73/510 |
| 2009/0230692 | A1 * | 9/2009 | Lopez | 290/55 |
| 2010/0007145 | A1 * | 1/2010 | Calley | 290/44 |
| 2010/0060000 | A1 * | 3/2010 | Scholte-Wassink | 290/44 |
| 2010/0140938 | A1 | 6/2010 | Cook | 290/44 |
| 2010/0143116 | A1 | 6/2010 | Zang et al. | 416/1 |
| 2010/0161151 | A1 * | 6/2010 | Yang et al. | 700/297 |
| 2010/0209245 | A1 * | 8/2010 | Migliori | 416/1 |
| 2011/0025058 | A1 * | 2/2011 | Nies | 290/44 |
| 2011/0175362 | A1 * | 7/2011 | Gracia Lopez | 290/55 |
| 2012/0251317 | A1 * | 10/2012 | Reitmaier | 416/61 |
| 2012/0318057 | A1 * | 12/2012 | Olesen | 73/170.06 |
| 2012/0326452 | A1 * | 12/2012 | Calley | 290/40 B |
| 2013/0144449 | A1 * | 6/2013 | Dalsgaard et al. | 700/287 |
| 2014/0145441 | A1 * | 5/2014 | Calley | 290/44 |
| 2014/0207296 | A1 * | 7/2014 | Kjær et al. | 700/287 |
| 2014/0236366 | A1 * | 8/2014 | Livadaras et al. | 700/286 |
| 2014/0246855 | A1 * | 9/2014 | Vasak et al. | 290/44 |

OTHER PUBLICATIONS

DK Search Report dated Apr. 19, 2011 for Application No. PA2010 00741, 1 page.

Hameed et al., "Condition Monitoring and fault detection of wind turbines and related algorithms: A Review", Renewable and Sustainable Energy Reviews, vol. 13, No. 1, Jan. 1, 2009, pp. 1-39, Publisher: Elseviers Science, New York, NY, US.

Bartzoudis et al., "An embedded sensor validation system for adaptive condition monitoring of a wind farm", Second NASA/ESA Conference on Adaptive Hardware and Systems, AHS 2007, Aug. 5, 2007, pp. 652-659, Publisher: IEEE, Piscataway, NJ, US.

Zaher et al., "A Multi-Agent Fault Detection System for Wind Turbine Defect Recognition and Diagnosis", 2007 IEEE Lausanne Power Tech, Jul. 1, 2007, pp. 22-27, Publisher: IEEE, Piscataway, NJ, US.

Echavarria et al., "Fault Diagnosis approach based on a model-based reasoner and a functional designer for a wind turbine. An approach towards self-maintenance", Journal of Physics: Conference Series 75 (2007) 012078, vol. 75, No. 1, Jul. 1, 2007, pp. 1-10, Publisher: Institute of Physics Publishing, Bristol, GB.

* cited by examiner

CHANGING A MODE OF OPERATION OF A WIND TURBINE

FIELD OF THE INVENTION

The present invention relates to a method of operating a wind turbine, and, in particular, a method of operating a wind turbine in specific situations.

BACKGROUND OF THE INVENTION

Today, wind turbines are complex and expensive power plants. In order to operate a wind turbine in a cost-effective manner, it is important that down time periods are as short as possible. However, this requirement can not be easily fulfilled, since the wind turbine has to be protected from damages, resulting, for example, from heavy loads caused by high wind speeds, or from failures of the wind turbine itself. In order to protect a wind turbine in heavy wind conditions it is generally known to shutdown the wind turbine in the case that wind speed exceeds a certain limit.

Moreover, from U.S. Pat. No. 7,476,985 B2 it is known to operate a wind turbine in a safe mode in the case that the wind speed exceeds a certain limit. In the safe mode the output power of the wind turbine is reduced.

From EP 2 026 160 A1 it is known to decide about the shutdown of a wind turbine, based on an event which is present, such as icing, structural integrity of parts of the wind turbine, etc.

Moreover, from EP 1 531 376 B1 a predictive maintenance system is known, which generates alarms related to failures or malfunctioning of mechanical components of a wind turbine, based on a vibration analysis.

It is an object of the present invention to provide a method of operating a wind turbine and a wind turbine providing an improved availability of the wind turbine.

SUMMARY OF THE INVENTION

According to a first aspect the invention provides a method of operating a wind turbine, comprises the steps of: receiving multiple sensor signals being indicative of the state of the wind turbine; analyzing the multiple sensor signals in order to determine whether a specific alarm condition is met as predefined in one of a plurality of different predefined alarm scenarios; further analyzing at least one of the multiple sensor signals in accordance with analyzing steps as predefined in the alarm scenario for which the specific alarm condition is met in order to determine whether the wind turbine is to be put into either a predefined safe mode, a shutdown mode or a continued operation mode.

According to a second aspect, the invention provides a wind turbine. The wind turbine comprises a tower, a nacelle, a rotor with at least one blade, and a control. The control is arranged to control the operation of a wind turbine, wherein the control includes a memory for storing a plurality of predefined alarm scenarios. The control is coupled to multiple sensors which are arranged to output sensor signals being indicative of the state of at least said wind turbine. The control is further arranged to analyze the multiple sensor signals in order to determine whether a specific alarm condition is met as predefined in one of the plurality of different predefined alarm scenarios; and to further analyze at least one of the multiple sensor signals in accordance with analyzing steps as predefined in the alarm scenario for which the specific alarm condition is met in order to determine whether the wind turbine is to be put into either a predefined safe mode, a shutdown mode or a continued operation mode.

Further aspects of the invention are set forth in the dependent claims, the following description and the drawings.

BRIEF DESCRIPTION OF THE DRAWINGS

Embodiments of the present invention are explained by way of example with respect to the accompanying drawings, in which.

DETAILED DESCRIPTION OF EMBODIMENTS

Figure 1:
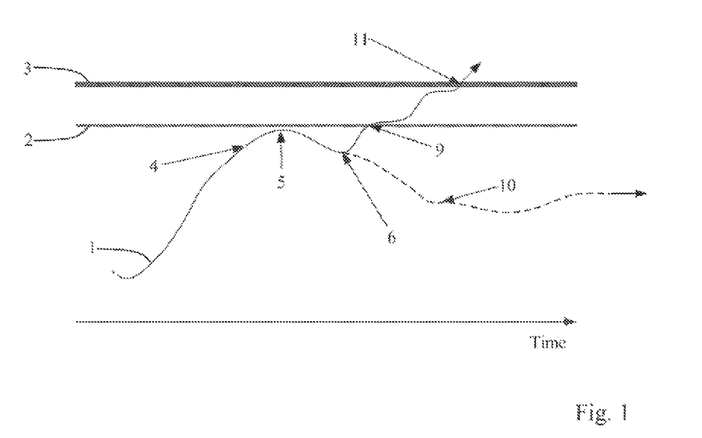
FIG. 1 illustrates a typical curve of a process variable of a wind turbine under usage of a fault tolerance control in accordance with the present invention.

FIG. 1 shows an example of a safe mode operation in accordance with an embodiment of the present invention. Before a detailed description of the embodiments, general explanations are made.

As mentioned in the outset, wind turbines are expensive power plants and it is the aim to operate a wind turbine in a way such that the overall down time is as short as possible. However, the wind turbine has to be protected from damages, resulting, for example, from heavy loads caused by high wind speeds, or from failures of the wind turbine itself, such as defects in the drive train, generator, hydraulic system etc.

As also indicated in the outset, in general, it is known to shutdown or stop a wind turbine in the case that a wind speed exceeds a certain value. However, this simple technique is not reliable in any case. For example, a wind speed sensor might be defect such that the wind turbine is also stopped in allowed weather conditions. Moreover, the complete stopping of a wind turbine might not be necessary in any case, when a wind speed exceeds a certain value.

U.S. Pat. No. 7,476,985 B2, mentioned at the outset, operates a wind turbine in a "safe mode", i.e. in a mode with reduced power output. The wind turbine is operated in the safe mode in the case, for example, that a wind speeds exceeds a certain limit of, e.g. 25 m/s, and/or other variables which are associated, for example, with the wind also exceed a predetermined value.

However, as recognized by the inventor, the pure determination, whether variables exceed a predetermined value does not take into account, for example, that the variable does not reflect the "true" state of the wind turbine, e.g. due to a sensor fault. Moreover, it is not possible to evaluate which operational state the wind turbine has and how the operational state develops.

The decision about the shutdown of a wind turbine can also be based on an event which is present, such as icing, structural integrity of parts of the wind turbine, fouling or erosion of rotor blades of the wind turbine, loosening of connections, problems in temperature control, as disclosed in EP 2 026 160 A1, mentioned at the outset. The event is detected by analyzing measure signal patterns, such as emitted noise of a wind turbine, power output of a wind turbine, etc.

EP 1 531 376 B1 mentioned at the outset pertains to a predictive maintenance system which generates alarms related to failures or malfunctioning of mechanical components of a wind turbine, based on a vibration analysis.

The inventor recognized that, e.g. the up-time of a wind turbine can be improved when the state of the wind turbine is analyzed and operated in dependence on a plurality of predefined different alarm scenarios according to which damages of the wind turbine could occur and according to which in the prior art generally the wind turbine would be shutdown, such as at high wind speeds.

In the embodiments, e.g. a controller of a wind turbine, receives multiple sensor signals, which are indicative of the state of the wind turbine. The multiple sensor signals are analyzed in order to determine whether a specific alarm condition is met as predefined in at least one of a plurality of different predefined alarm scenarios. An alarm condition can be, for example, that a sensor signal meets a predefined value, such as a wind speed which is above a predefined limit. The sensor signal, such as a wind speed can be determined, for example, from a wind speed sensor signal or from other signals, from which a wind speed can be derived, such as the rotor speed, or the like.

In the case that a specific alarm condition is met, further predefined "rules" of the alarm scenario, for which the alarm condition is met, are processed. Such rules can comprise, for example, rules in the form of predefined analyzing steps according to which at least one of the multiple sensor signals is to be analyzed. The analysis of the at least one of the multiple sensor signal is performed in accordance with analyzing steps as predefined in the alarm scenario, for which the specific alarm condition is met, in order to determine whether the wind turbine is to be put into either a predefined safe mode, a shutdown mode or a continued operation mode.

Other rules, which are predefined in the alarm scenario, comprise, for example, rules for deciding in which mode the wind turbine should be further operated and/or rules defining the safe mode itself, for example in the form of a control strategy according to which the wind turbine shall be operated during the safe mode.

The safe mode can be a mode in which the wind turbine is operated with reduced power output, but it can also be a mode, in which, e.g. further analysis steps are performed, such as a sensor failure analysis or similar and the wind turbine operation is continued with full output power. The safe mode can also comprise performing an untwist-cable operation, performing a cooling operation, monitoring at least one sensor signal for detecting whether a threshold value is exceeded, etc.

The shutdown mode can be performed, for example, by setting the blades into a position where they generate no lift, by setting the blades into stall position, and/or actuating a brake and/or yawing the nacelle out of the wind, etc.

In some embodiments the decision in which mode the wind turbine is to be operated—safe, shutdown or continued operation mode—is taken in a two stage process. In a first stage it is analyzed, whether an alarm condition is met and in second stage the state of the wind turbine represented by the received sensor signals is further analyzed in accordance with analyzing steps predefined in respective alarm scenarios. By this further analyzing it is possible to react in a flexible way to operation states of the wind turbine, which might be critical in the sense that they could cause damage. Moreover, in some embodiments, it is possible to operate the wind turbine even in the normal operation mode without reducing power in cases, in which according to the prior art solutions the wind turbine is shutdown or put into a safe mode. Moreover, in some embodiments it is possible to address any kind of specific state of the wind turbine by providing the plurality of predefined different alarm scenarios, which might in principle lead to damage and to foresee a specific analysis and safe mode strategy for such a specific state. Thus, in some embodiments the number of wind turbine stops during operation can be reduced, which can lead to a reduction of the overall down time and thereby to a maximization of the power output.

In some embodiments, a comparison of one or more sensor signals with a threshold is only used in the first stage for deciding whether a specific alarm condition is met, such as in the case the wind speed mentioned above. In the further analysis of the second stage, the state of the wind turbine is further analyzed by further analyzing at least one of the multiple sensors. For instance in the case of the wind speed example, loads on the blades and the tower can be analyzed by analyzing respective sensor signals. Based on this analysis, it is possible to further analyze the state of the wind turbine and to derive, e.g. which kind of safe mode can be selected in order to further operate the wind turbine and, e.g. with which reduced output power a justifiable safe mode operation with respect to expected loads on the wind turbine is possible.

In some embodiments, the at least one of the multiple sensor signals being analyzed in the step of further analyzing is different from the multiple sensor signals leading to the determination that the specific alarm condition is met. For example, in the case that a wind speed signals exceeds a threshold value, the alarm condition of the high wind speed alarm scenario is met. The high wind speed alarm scenario defines further sensor signals, such as rotor speed signals and output power signals, with which at least an estimation of the wind the speed can be derived.

In some embodiments, the analyzing steps comprise the determination of a sensor fault. For instance, by comparing the directly measured wind speed with the estimated wind speed, as explained above, it is possible to determine whether the wind speed sensor is faulty or not. Typically, in the embodiments, wind turbines have multiple sensors for monitoring the operation and the state of the wind turbine, such as sensors for measuring the temperature (ambient, in the nacelle, at the drive train, hydraulic oil, etc.), wind speed and wind direction, blade pitch angle, blade position, etc. As sensor signals from one sensor might not be reliable, e.g. in the case of a malfunction of the sensor, multiple sensor signals from different sensors can be analyzed for determining the malfunction of a sensor and/or for analyzing the (true) state of the wind turbine.

In some embodiments, the analyzing steps comprise the simulation of a theoretical state of the wind turbine. Referring to the wind speed example, the simulation of the theoretical state of the wind turbine can be based on output power signals, generator current signals and rotor speed signals and model parameters characterizing the wind turbine. By simulating the wind turbine, based on the model parameters, and using the output power, generator current and rotor speed signals, it is possible to derive a theoretical state of the wind turbine and to calculate the wind speed which would lead to this state of the wind turbine.

In some embodiments, the simulated theoretical state of the wind turbine is used for controlling the wind turbine in the safe mode. For example, in the case that a sensor has a malfunction, a respective theoretical state of the wind turbine can be simulated and based on this simulation a value can be generated, which otherwise would be derived from the sensor signals of the faulty sensor. Hence, in some embodiments it is possible to further operate the wind turbine in the safe mode, e.g. without reducing the power output by substituting the faulty sensor signals with the values or signals derived from the simulation of the theoretical state of the wind turbine.

In some embodiments, the value derived from the simulation of a theoretical state of the wind turbine is compared to a sensor signal of the wind turbine. The comparison can include, for example, a calculation of a deviation between the sensor signal and the value. In such embodiments, the decision to put the wind turbine into the safe mode can be based on the calculated deviation between the sensor signal and the value.

In some embodiments, the safe mode depends on a predefine alarm scenario. The safe mode is, for example, predefined in the alarm scenario or the alarm scenario includes rules according to which a safe mode can be generated. Thus, in some embodiments, for each alarm scenario a specific safe mode can be predefined, such that various different critical operational states of the wind turbine can be addressed.

In some embodiments, the predefined alarm scenarios each include at least specific alarm condition information defining for a sensor signal analysis result that the alarm condition is met, information about the analysis steps, information in which case the wind turbine shall be put into the safe mode, shutdown mode or continued operation mode, and information about the safe mode to be performed by the wind turbine. Hence, as mentioned above, the alarm scenarios can comprise a complete set of rules, according to which a plurality of different critical situations, which might occur during operation of a wind turbine, can be dealt with without having to shutdown the wind turbine.

In some embodiments, the multiple predefined alarm scenarios include at least one of: high ambient temperature of the wind turbine, high temperature on the wind turbine generator, high temperature on the wind turbine drive train, stop on high wind speed, wind turbine blade pitch deviation error, error on all wind sensors of the wind turbine, wind turbine blade pitch position error, high temperature on a wind turbine hydraulic system.

In some embodiments, the multiple sensor signals include signals being indicative of at least one of: wind speed, wind direction, ambient temperature, wind turbine generator temperature, wind turbine drive train temperature, wind turbine hydraulic system temperature, blade position, grid voltage, number of cable twists, output power, nacelle temperature, thermo relay error, loads on tower, tower vibrations, rotor speed, pitch angle, loads in blades, cooling capacity, oil pressure, generator current.

The multiple sensor signals or information derived thereof can also be received from another wind turbine, which is, for example, adjacent to the wind turbine, which shall be operated. Hence, in some embodiments, information about the operational state of at least one neighboring wind turbine can be used for control or operation of the wind turbine under consideration. For example, faulty sensor signals, such as wind speed sensor signals, can be replaced by respective wind speed sensor signals of the neighboring wind turbine which are assumed to be at least similar to the faulty ones. In the case of the wind speed it is assumed that the wind speed measured at the neighboring wind turbine is similar to the wind speed of the wind turbine with the faulty sensor.

The term "signal", as used herein, can be a signal, which is, for example, directly output by a sensor or it can be a signal, which is based on a sensor signal directly output by a sensor.

By using a plurality of predefined different alarm scenarios and multiple sensor signals, it is possible to address many alarm situations which can occur during operation of a wind turbine and to provide for each alarm situation predefined control or safe mode strategies which are defined in respective alarm scenarios. In some embodiments, the alarm scenarios can have different priorities, which depend, for example, on the strength of damage which might be expected due to a specific fault warning or, e.g. whether requirements are violated which have to be necessarily fulfilled, such as a requirement of a grid to which the wind turbine is connected and which only allows that current fed into the grid has a certain voltage.

In accordance with a specific alarm scenario, a specific alarm signal can be generated. The alarm signal can be transferred, for example, to a remote control indicating personnel that a respective alarm situation is present and, e.g. that the wind turbine has to be maintained.

Some embodiments refer to a wind turbine, which is adapted to perform the above described method(s). The wind turbine comprises typical parts, such as a tower, a nacelle, a rotor with at least one blade, a control for controlling the operation of a wind turbine. The control includes a memory for storing multiple predefined alarm scenarios; and is coupled to multiple sensors (that may be part of said wind turbine and/or even other wind turbines) and which are arranged to output sensor signals being indicative for an operational state of the wind turbine (or the other wind turbines). The control analyzes the multiple sensor signals in order to determine whether a specific alarm condition is met as predefined in one of the plurality of different predefined alarm scenarios. The control further analyzes at least one of the multiple sensor signals in accordance with analyzing steps, as predefined in the alarm scenario for which the specific alarm condition is met, in order to determine whether the wind turbine is to be put either into a predefined safe mode, a shutdown mode or a continued operation mode as discussed above.

In some embodiments, the multiple sensors include at least one of: wind speed sensor, nacelle temperature sensor, blade position sensor, tower vibration sensor, hydraulic oil temperature sensor, ambient temperature sensor, generator temperature sensor, rotor speed sensor, wind direction sensor, generator voltage sensor, cable twist sensor, drive train temperature sensor, loads on tower sensor, cooling capacity sensor, oil pressure sensor, generator current sensor, or other sensors which are known to the skilled person and which are used for monitoring and measuring the state of a wind turbine.

In some embodiments, the wind turbine backs off to a safe operation mode, when applicable and needed, instead of stopping when a fault occurs and then it stays in this safe mode until, for example, the reason for this error has been clarified. After clarification it returns, for example, to normal operation. Of course, critical malfunctions which might lead to severe damages result in a shutdown of the wind turbine, in some embodiments. In some embodiments, the wind turbine uses a control strategy, during the safe mode.

Returning to FIG. 1, there is shown an example of a control strategy performed during a safe mode operation for illustration purposes. A process variable of a wind turbine 19 (FIG. 3), such as a wind speed signal, varies within time and the resulting curve is indicated with 1. There exist two thresholds for the process variable. A first threshold 2 at which an alarm is generated and a second threshold 3 at which the turbine is stopped. As can be taken from FIG. 1 the process variable increases its value within the time. The process variable is analyzed and at a point 4 a specific alarm condition of a specific alarm scenario 30 (FIG. 5) is met. A further analysis or diagnosis of sensor signals is performed at 5. The sensor analysis is defined in the specific alarm scenario for which the specific alarm condition has been met at 4. Based on the analysis of the sensor signals, as defined in the analysis steps of the alarm scenario 30, a control strategy is selected and the wind turbine 19 is put into a safe mode operation at 6.

At point 6 the curve 1 shows two different distributions. The dashed distribution 10 shows the further development of the process variable under the fault tolerance control defined in the alarm scenario. The control strategy during safe mode allows to further operate the wind turbine, e.g. with reduced power output, such that a faulty process variable stays under the first and second thresholds 2, 3.

The solid distribution of curve 1 after the point of decision 6 shows how the process variable would vary in the case that the wind turbine is not put into the safe mode. In this case, the process variable would exceed threshold 2 at 9 at which an alarm is generated and also the second threshold 3 at 11 at which the turbine would be shutdown, as it is done, for example in accordance with the prior art.

Returning to FIGS. 2 and 3, there is illustrated an embodiment of a method for operating wind turbine 19 (FIG. 3), as exemplary describe in connection with FIG. 1 above. The method is performed, for example, by a control 24 of the wind turbine 19. The wind turbine 19 has a tower 23 on which a nacelle 22 is mounted. The nacelle 22 can rotate about its vertical axis. Moreover, a rotor 21 with three blades 20 is positioned at the nacelle 22, driving a drive train, a gear and a generator for generating current (not shown), as known to the skilled person.

Figure 3:
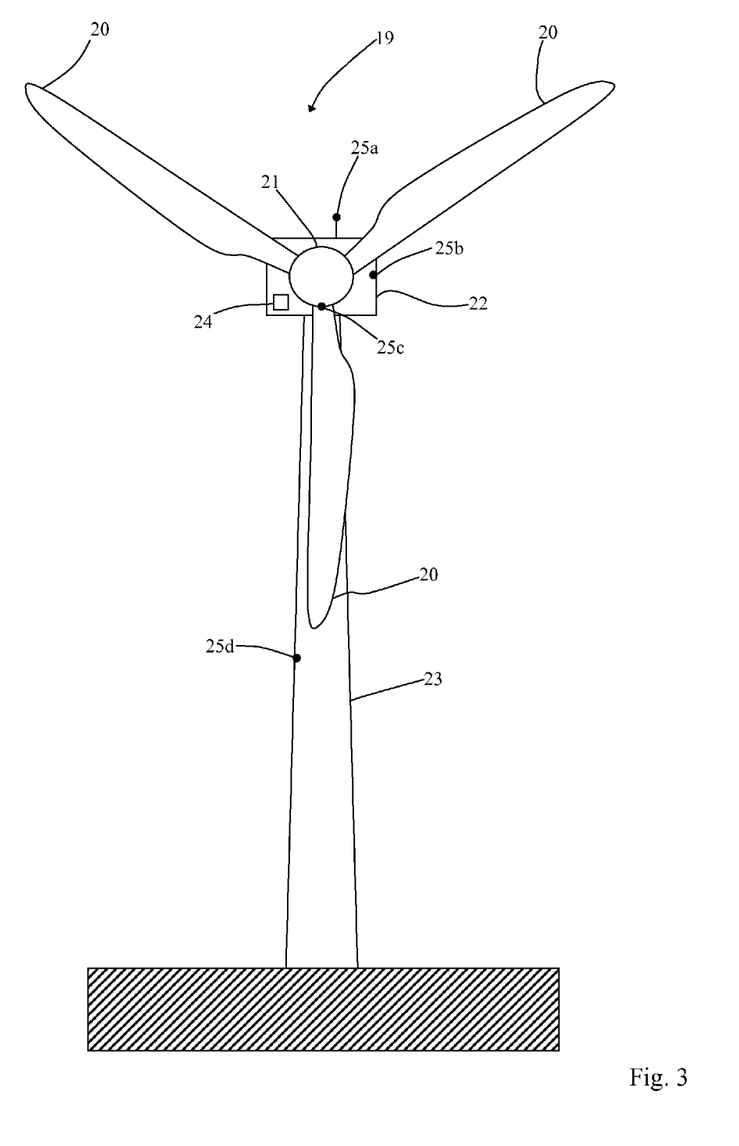
FIG. 3 schematically illustrates an embodiment of a wind turbine in accordance with the present invention.

The control 24 is located in the nacelle 22 and it receives sensor signals from multiple sensors. In alternative embodiments, the control 24 can be located in the tower or outside the wind turbine 19.

Exemplary, in FIG. 3 a wind speed sensor 25a, a nacelle temperature sensor 25b, a blade position sensor 25c and a tower vibration sensor 25d are shown, which deliver sensor signals to the control 24. Typically, as also mentioned above, much more sensors are located at the wind turbine 19 in order to monitor and measure the state of a wind turbine.

Figure 2:
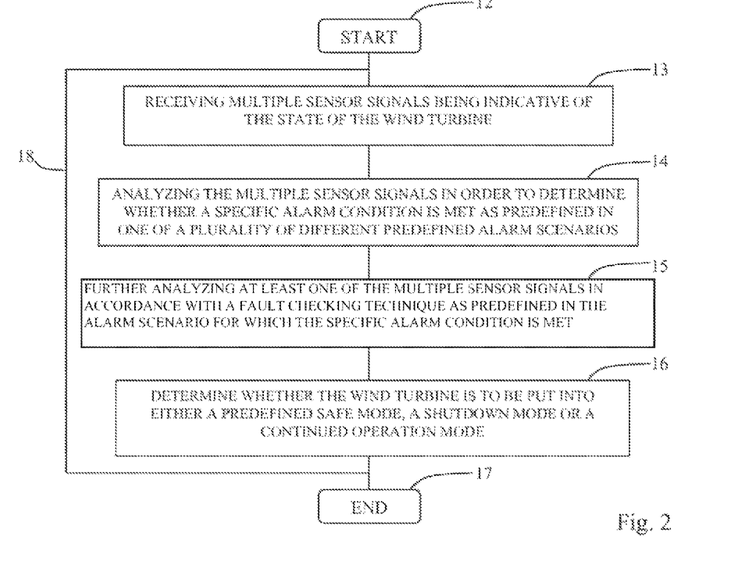
FIG. 2 shows a flow chart of an embodiment of a method for operating a wind turbine in accordance with the present invention.

For operating the wind turbine 19, the control 24 performs the method as illustrated in FIG. 2. At 12 the method starts and the control 24 receives multiple sensor signals, e.g. from sensors 25a-d, which are indicative of the state of the wind turbine. As the control 24 also knows where a respective sensor is located from which it receives respective sensor signals, the control 24 has a location information and a physical information about the wind turbine 19, when receiving a specific sensor signal, such as the temperature in the nacelle 22 from the nacelle temperature sensor 25b, a current wind speed on top of the nacelle 22 from the wind speed sensor 25a, a blade position of a specific blade 20 from the blade position sensor 25c and signals indicative of tower vibrations from the tower vibration sensor 25d.

Figure 4:
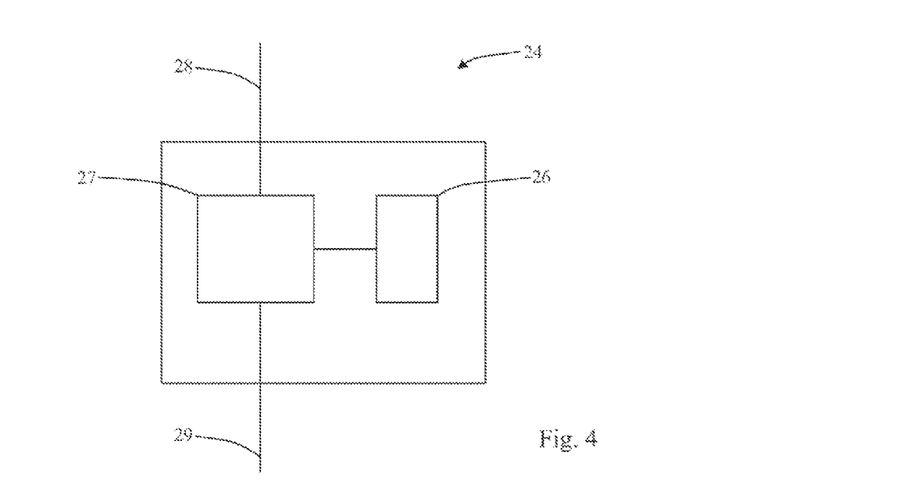
FIG. 4 schematically illustrates a control for controlling a wind turbine of FIG. 3.

The control 24, see also FIG. 4, receives the multiple sensor signals, such as delivered from sensors 25a-d, via an input line 28. At 14, the control 24 analyzes the received sensor signals and determines whether a specific alarm condition is met, as predefined in one of a plurality of predefined alarm scenarios.

The sensor signals can be received from one sensor or multiple sensors, such as a sensor array, or a sensor group, which provide signals which are indicative of a specific characteristic of the state of the wind turbine, such as a temperature at a specific location (nacelle, ambient, hydraulic oil), a wind speed/direction, vibrations of the tower, position of a blade, position of the nacelle, etc.

Figure 5:
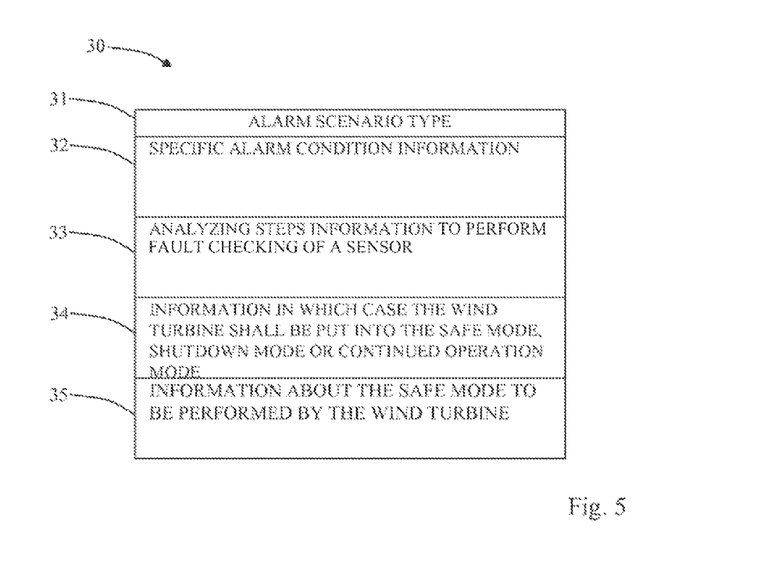
FIG. 5 schematically illustrates an alarm scenario as used in some embodiments of the present invention.

The predefined alarm scenarios are stored in a memory 26 of the control 24. An exemplary alarm scenario 30 is depicted in FIG. 5. The alarm scenario 30 includes information, which can be formatted, e.g. in data fields 31 to 35.

Typically, an alarm scenario includes information 31 about the type for which critical situation the alarm scenario is provided, such as high wind speed alarm scenario, high temperature on the generator alarm scenario, etc. Moreover, each specific alarm scenario 30 has a specific alarm condition information 32, which predefines which conditions must be fulfilled by the analyzed sensor signals such that the specific alarm scenario is relevant. Each specific alarm scenario 30 has analysis step information 33, predefining which analysis steps have to be performed and according to which the received sensor signals are further analyzed. Each specific alarm scenario 30 has also information 34 in which case the wind turbine shall be put into the safe mode, shutdown mode or continued operation mode. Additionally, the alarm scenario 30 has information 35 about the safe mode to be performed by the wind turbine, such as control strategy information (fault control information), information about the power reduction, etc. Below, ten exemplary predefined alarm scenarios are described in more detail.

Thus, when analyzing the received multiple sensor signals, the control 24 goes through the alarm scenarios 30 stored in the memory 26 and determines, whether a specific alarm condition is met, e.g. by comparing sensor signals from one sensor or from a sensor group with a predefined threshold, such as a wind speed threshold, defined in a respective specific alarm condition 32.

In the case that a specific alarm condition 32 is met, the control 24 selects and further processes the respective alarm scenario 30, for which the alarm condition 32 is met.

At 15, the control 24 further analyzes at least one of the received sensor signals in accordance with the analyzing steps information 33, as defined in the currently processed alarm scenario. The analyzing steps information 33 defines, for example, which sensor signals should be analyzed, gives rules for a simulation for a theoretical state of the wind turbine, defines a fault sensor analysis, etc., as described above.

The fault sensor analysis can be performed, e.g. by comparing the sensor signals from a sensor to be checked, with other sensor signals or with a calculated value, which is based on a theoretical simulation of the state of the wind turbine 19 and/or a value derived from other sensor signals, which are different from the sensor signals used for the decision that the specific alarm condition is met.

Hence, the control 24 compares in some embodiments sensor signals which are directly indicative of a characteristic of the wind turbine 19, with signals, which are indirectly indicative of a characteristic of the wind turbine, such as the power output, rotor speed or the like, or which are simulated.

Moreover, in some embodiments, the control 24 analyzes, based on the analyzing steps information 33, sensor signals which are indicative for a first characteristic of an operational state of the wind turbine 19, such as wind speed, and/or which met the alarm condition, and sensor signals which are indicative of a second characteristic of the operational state of the wind turbine 19, such as loads on the tower 23, in order to get more information about the state of the wind turbine 19.

After the control 24 has analyzed the sensor signals according to the analyzing steps information 33, it decides at 16, based on the analysis result, whether the wind turbine 19 should be put into a safe mode, whether normal operation can be continued or whether the wind turbine 19 should be shutdown. The rules in which case the wind turbine 19 shall be put into the safe mode are defined by the information field 34 of the alarm scenario 30. Also the type of the safe mode, including how the wind turbine should be operated, whether further sensor signals are monitored, which control strategies should be performed can be defined in information 35 about the safe mode to be performed by the wind turbine 19.

The control 24 outputs a control signal via a line 29 in accordance with the decision made at 16, such that the wind turbine 19 is either put into a safe mode, continued operation mode or shutdown mode.

The control signal includes further control mode information, e.g. about the safe mode, causing the wind turbine 19 to be operated with reduced power output, etc. The amount of power output reduction can also be defined in the alarm scenario 30, e.g. in field 35, or it is determined, for example, based on load measurements and/or calculations/simulations, which are expected in a specific alarm scenario with a specific safe mode.

The control 24 can also output an alarm signal via line 29, which is indicative, for example, for a specific alarm scenario 30 which is currently processed. Moreover, the alarm signal or another signal, which is output by control 24, can include service information, sensor fault information or other information derived when processing a specific alarm scenario 30.

The service information can be used for deciding whether and/or when the wind turbine has to be maintained. Thereby, service costs can be lowered in some embodiments. Moreover, control 24 can output a residual signal, which indicates, for example, a deviation of measured sensor signals and signals from other sensors and/or which are based on a simulation of the wind turbine. The residual signal can also be used for research and development.

The signals output by control 24 can also be transferred, for example, to a remote control for further analysis of the state of the wind turbine, for being used in research projects, for service issues, etc.

The control 24 generally continues operation as indicated at 18 after a predefined alarm scenario has been performed; otherwise the operation ends at 17.

In the following, eight specific alarm scenarios are described in more detail, which are used at least in some embodiments.

High Ambient Temperature Alarm Scenario

This alarm scenario is triggered in the case that a high ambient temperature sensor signal is detected resulting from an ambient temperature measurement.

The purpose of the high ambient temperature alarm scenario is to decrease the number of wind turbine stops when the ambient temperature exceeds a certain temperature limit.

For analyzing the wind turbine state the ambient temperature, the nacelle temperature and the power production are checked by analyzing respective sensor signals representing the ambient temperature, the nacelle temperature and the power production.

The different sensor measurements and the respective sensor signals are used for sensor fusion and an estimate of the generator temperature is generated. Based on this analysis it is decided, whether a sensor fault is present and a respective output signal is generated, which indicates either that a sensor fault is present or that the ambient temperature really increased.

In the case that a sensor fault is present or the ambient temperature really increased, the wind turbine is put into safe mode operation in which the power production is reduced. The safe mode is valid until the ambient temperature decreases to an allowable value. In this case the wind turbine is switched back to the normal operation mode with normal power output. In the case that the temperature is still increasing the wind turbine is stopped.

In some embodiments, the temperature range of components is exceeded which can result in derating of performance and loss of functions. Moreover, in some embodiments the ambient temperature is logged. The temperature information can be used, e.g. for analyzing the temperature load on components of the wind turbine, such as the generator etc.

According to the high ambient temperature alarm scenario an alarm signal and control mode information are output. The control information is used to reduce the power output of the wind turbine.

High Temperature on the Generator Alarm Scenario

The purpose of the high temperature on the generator alarm scenario is to decrease the number of wind turbine stops when a generator temperature increases above a given threshold value.

The high temperature on the generator alarm scenario is triggered, for example, in the case that a measured generator temperature exceeds a certain threshold.

As input sensors signals are used: thermo relay error signals, generator temperature signals, power signals, nacelle temperature signals, and ambient temperature signals. In some embodiments, e.g. also at least one of generator current signals, cooling capacity signals or the like can be used in addition to or instead of at least one of the above-mentioned input sensor signals.

The sensor signals indicating the ambient temperature, the nacelle temperature, the generator temperature and the power production are analyzed and the different sensor measurements are combined in order to perform sensor fusion and to the thereby get an estimate of the "real" generator temperature. In other embodiments, only some of theses sensor signals are analyzed and/or further sensor signals, such as mentioned above, are analyzed.

Based on the analysis result, a control signal can be generated, which indicates either a sensor fault or a real increase in the generator temperature.

In some embodiments, the wind turbine is put into a safe mode in which the power is reduced in the case of a real increase in the generator temperature, based on an assessment of the work point of the wind turbine. For this assessment, a power-current curve of the generator can be used.

Moreover, it is possible to put the wind turbine into a safe mode in which the power output is derated in order to lower the temperature of power components.

The generator temperature is further monitored during safe mode operation and in the case that the generator temperature is still increasing the wind turbine is stopped.

In some embodiments, the generator has to be monitored, since the operation of the generator at higher temperatures might cause generator damages and, moreover, the insulation lifetime might be reduced.

According to the high temperature on the generator alarm scenario an alarm signal and control mode information including information about the derated power are output.

High Temperature on the Drive Train Alarm Scenario

The purpose of the high temperature on the drive train alarm scenario is to decrease the number of wind turbine stops in the case that the drive train temperature increase above a certain threshold value.

As input signals are used: thermo relay error signals, generator temperature signals, power signals, nacelle temperature signals, and ambient temperature signals. In other embodiments, e.g. also at least one of bearing temperature signals, rotor speed signals and cooling capacity signals or the like are used in addition to or instead of at least one of these input signals.

The ambient temperature and the nacelle temperature signals are used for analyzing the temperature situation. Moreover, oil cooler fouling is checked and whether the oil coolers are set to auto function or whether they are switched off. Different sensor measurement signals are analyzed and sensor fusion is performed in order to get an estimate of the drive train temperature. In other embodiments, only some of theses sensor signals are analyzed and/or further sensor signals, such as mentioned above, are analyzed.

A control signal is generated which carries fault information, which can be used to indicate a sensor fault or a real increase in drive train temperature.

In dependence on the analysis result, the wind turbine is put into a safe mode, in which the following control strategies are used:

When the nacelle temperature is low, e.g. <10° C., cooling fans are controlled, e.g. they are switched on.

In the case that the nacelle temperature is high, e.g. >30° C., and/or fouled coolers are detected, the output power and the drive train speed are reduced and a timeout strategy is selected, which is based, e.g. on the operation time within which no (severe) damages are expected.

If the drive train temperature is still increasing the wind turbine is stopped.

In some embodiments, the operation of the wind turbine can be continued on a short term scale, such as i.e. 10-30 minutes, without any damages on the drive train. However, in some embodiments, on the long term scale oxidation of the gear oil, a reduced oil film thickness, increasing wear and reducing fatigue life time are expected. These effects can be taken into account, for example, in a maintenance schedule.

In some embodiments, additionally a temperature measurement in the return oil system is performed and the respective sensor signal is taken into account when analyzing the operational state of the wind turbine.

In accordance with the high temperature on the drive train alarm scenario an alarm signal and control mode information including information about the derated output power are output.

High Wind Speed Alarm Scenario

The purpose of the high wind speed alarm scenario is to decrease the number of wind turbine stops when the wind speed is above a critical threshold, also called cutout wind speed.

As input signals are used: wind speed signals, load measurements (estimates) regarding the tower, tower vibration signals, output power signals, and rotor speed signals. In other embodiments, e.g. also at least one of blade load signals, pitch angle signals and ambient air density signals or the like are used in addition to or instead of at least one of these input signals.

During the analysis of the wind turbine state the wind speed measurements are checked. In some embodiments a wind estimator is used in order to verify that there is no fault on the wind measurement. In other embodiments, only some of theses sensor signals are analyzed and/or further sensor signals, such as mentioned above, are analyzed.

During the safe mode, the load level of the wind turbine and tower vibrations are checked in order to monitor the operation strategy.

In the safe mode, the following control strategies are used:

The wind speed and the loads are analyzed. For each subsystem which is affected by high wind speeds it is analyzed, whether a safe mode operation is allowable.

In the case that for the subsystems a safe mode operation is allowable, the output power is derated, for example to a value below 50%, and the rotations per minute of the rotor are reduced in steps as a function of the wind speed measurement and/or of the wind speed result output by the wind speed estimator.

In some embodiments, this safe mode allows continued operation of the wind turbine at wind speeds above 25 m/s by derating the output power and/or the rotations per minute of the rotor accordingly. The derating of the output power can be done continuously and/or in discrete steps.

In some embodiments, the loads on the tower and tower vibrations are monitored, in order to stop the wind turbine in the case that allowable threshold values are exceeded. This monitoring is useful in some embodiments for detecting extreme and large fatigue loads, especially at tilt, yaw and flap operations.

In some embodiments, further additional load sensors/estimators and/or accelerometers at the tower, the rotor blades, the drive train, etc. are used and the sensor signals are taken into account for analyzing the operational state of the wind turbine.

In accordance with the high wind speed alarm scenario an alarm signal and control mode information including information about the derated power output are output.

Pitch Deviation Error Alarm Scenario

The purpose of the pitch deviation error alarm scenario is to decrease the number of wind turbine stops when there is a deviation in the pitch system detected.

Pitch angle measurement signals are used as input signals.

For analyzing the operational state, a system check sequence both on the pitch angle sensors and pitch actuators, i.e. a sensor functionality check, is performed. It is checked, for example, whether a proportional valve of the hydraulic system and position sensors are working. If they are working properly, the wind turbine is switched to the safe mode.

In the safe mode the following control strategies can be used in some embodiments:

The pitch angle is controlled, based on loads, e.g. on the blades, and not on position errors. Hence, the tilt and yaw loads are controlled for each blade and thereby the pitch angle is corrected.

A load estimation is performed in order to adjust alarm limits, i.e. threshold values for the pitch angle at which the alarm scenario is used.

Moreover, in some embodiments, a strategy is used that predicts high pitch rates expected in the future, e.g. during safe mode operation.

Additionally, in some embodiments a controller is optimized around the working point of the wind turbine and the respective pitch deviations.

In some embodiments, consequences of continuous operation as function of time might be increased loads—on the short term scale increased extreme loads might occur and on the long term scale increased fatigue loads might occur. These problems can be addressed, for example, by a respective maintenance schedule.

In some embodiments, a robust load sensor system which is reliable and accurate is used in order to reduce the risk of pitch deviation errors and over-speed situations as well as to reduce aerodynamic imbalances which might lead to extreme tilt and yaw operations.

In accordance with pitch deviation error alarm scenario an alarm signal and control mode information including pitch references are output.

Error on all Wind Sensors Alarm Scenario

The purpose of the error on all wind sensors alarm scenario is to decrease the number of wind turbine stops when there is an error on all wind sensors.

As input signals are used: wind speed signals, wind direction signals, wind estimation signals, generator speed signals, rotor speed signals, and output power signals. In other embodiments, e.g. also at least one of blade load signals, pitch angle signals and ambient air density signals or the like are used in addition to or instead of at least one of these input signals.

During the operation state analysis, a system check sequence on the wind sensors, i.e. wind speed and wind direction sensors, is carried out. In other embodiments, only some of theses sensor signals are analyzed and/or further sensor signals, such as mentioned above, are analyzed.

In the case that wind sensor errors are detected, the wind turbine is switched into the safe mode.

In some embodiments, during the safe mode the following control strategies are performed:

In order to determine the wind speed, a wind estimator is used. Additionally, load measurements to evaluate critical yaw errors and critical wind speeds can be used.

Moreover, in some embodiments alternative wind measurement technologies are used, e.g. a cup anemometer (e.g. a wind vane) and an ultrasonic sensor. These wind sensors support each other during operation, since one of the sensors might have a better performance in specific operation condition than the other one. For instance, the ultrasonic sensor is able to react faster on changing wind conditions than an anemometer. Moreover, the ultrasonic sensor is not as sensitive to icing as a cup anemometer.

In the case that the wind turbine is located next to another wind turbine, such as it is the case in a wind park, it can make use of wind sensor measurements from another wind turbine, which is, e.g. in the neighborhood. In such embodiments, the wind turbines can communicate to each other, for example, directly or indirectly over a central (wind park) control.

In some embodiments, high wind speed situations and extreme yaw errors might occur and in such a case the wind turbine can be stopped.

Moreover, a predefined output power-rotor speed curve might be outside a normal operating range and, thus, in some embodiments the output power-rotor speed curve is optimized also for the safe mode operation in accordance with the error on all wind sensors alarm scenario.

In accordance with the error on all wind sensors alarm scenario an alarm signal and control mode information including a wind estimate are output.

Pitch Position Error Alarm Scenario

The purpose of the pitch position error alarm scenario is to decrease the number of wind turbine stops when the pitch position measurement is faulty.

Pitch angle measurement signals are used as input sensor signals.

During the state analysis of the wind turbine a check sequence on the pitch position sensor function is performed.

In the case that the pitch position sensor is faulty, the wind turbine is put into a safe mode, e.g. with derated power output. In the case that the pitch position sensor(s) is (are) working, the wind turbine is put into safe mode. In this case, the following control strategies are used in the safe mode:

In some embodiments, the different pitch position sensor measurement signals and other sensor signals, such as pitch angle sensor signals, are integrated and a sensor fusion is performed in order to get an estimate of the actual pitch position.

In some embodiments, a consequence of continuous operation as function of time with the pitch position error might be high wind turbine loads, which are taken into account, e.g. when maintaining the wind turbine.

In accordance with the pitch position error alarm scenario an alarm signal and control mode information including pitch angle information are output.

High Temperature in the Hydraulic System Alarm Scenario

The purpose of the high temperature in the hydraulic system alarm scenario is to decrease the number of turbine stops when the hydraulic system temperature increases above a predefined threshold value. The hydraulic system of a wind turbine is typically used for pitch control of the blades.

As input signals are used: hydraulic temperature signals, nacelle temperature signals, and ambient temperature signals. In other embodiments, e.g. also at least one of pitch activity signals, hydraulic oil pressure signals and cooling capacity signals or the like are used in addition to or instead of at least one of these input signals.

For analyzing the state of the wind turbine, a system check sequence is performed. The wind turbine can be put into a safe mode where the pitch control is running on estimated values or it can run with a derated pitch control strategy. The estimated values can comprise, for example, an estimation of the hydraulic system temperature. In some embodiments, the estimation of the hydraulic system temperature takes pitch variations and the hydraulic oil pressure into account. For instance, in cases of frequent pitch variations and high hydraulic oil pressures a higher hydraulic system temperature is expected than in cases of rare pitch variations and normal hydraulic oil pressure. Hence, from the frequency of pitch variations and the hydraulic oil pressure, e.g. in combination with at least one of the above-mentioned temperature values (hydraulic, nacelle and ambient temperature), an estimation of the temperature of the hydraulic system can be derived. In other embodiments, only some of theses sensor signals are analyzed and/or further sensor signals, such as mentioned above, are analyzed.

If it is detected that the pitch variation frequency is low and the hydraulic oil pressure is in a normal range, a hydraulic temperature sensor fault is assumed in some embodiments and the pitch control is further normally operated. In the case that the hydraulic oil pressure is low and the pitch variation is frequent, the pitch control can reduce the pitch variation frequency in order to reduce the hydraulic temperature and to avoid the stop of the wind turbine.

In other embodiments, the estimated hydraulic temperature is monitored and the wind turbine is only stopped when the estimated hydraulic temperature is greater than a second threshold value.

In some embodiments, a consequence of continuous operation as function of time in accordance with the high temperature in the hydraulic system alarm scenario might be oil destruction. Hence, in some embodiments the hydraulic oil is taken into account when maintaining the wind turbine.

In accordance with the high temperature in the hydraulic system alarm scenario an alarm signal and control mode information including information about the hydraulic oil temperature is output.

As is apparent to the skilled persons, the above alarm scenarios are only exemplary and other alarm scenarios can also be used within the scope of the present invention as set forth in the claims.

The invention claimed is:

1. A method of operating a wind turbine, comprising:
   receiving multiple sensor signals being indicative of a state of the wind turbine;
   analyzing at least a first one of the multiple sensor signals in order to determine whether a specific alarm condition is met, wherein the alarm condition is defined in one of a plurality of different predefined alarm scenarios; and upon determining that the alarm condition is met, fault checking the first sensor signal using at least a second one of the multiple sensor signals and a fault checking technique defined in the alarm scenario corresponding to the alarm condition to determine whether the wind turbine is to be put into one of: a predefined safe mode, a shutdown mode, and a continued operation mode.

2. The method of claim 1, wherein the second sensor signal is different from first sensor signal used to determine that the alarm condition is met.

3. The method of claim 1, wherein the fault checking technique, when executed, identifies whether a sensor outputting the first sensor signal is faulty.

4. The method of claim 1, wherein the fault checking technique comprises simulating a theoretical state of the wind turbine based on the second sensor signal.

5. The method of claim 4, further comprising:
controlling the wind turbine in the safe mode based on the simulated theoretical state of the wind turbine.

6. The method of claim 1, wherein the safe mode is defined in the alarm scenario corresponding to the alarm condition.

7. The method of claim 1, wherein the predefined alarm scenarios each includes a respective alarm condition, a respective fault checking technique, information for determining whether the wind turbine shall be put into the safe mode, the shutdown mode or the continued operation mode, and information defining how the safe mode is to be performed on the wind turbine.

8. The method of claim 1, wherein the multiple predefined alarm scenarios include at least one of: high ambient temperature of the wind turbine, high temperature on the wind turbine generator, high temperature on the wind turbine drive train, stop on high wind speed, wind turbine blade pitch deviation error, error on all wind sensors of the wind turbine, wind turbine blade pitch position error, and high temperature on a wind turbine hydraulic system alarm scenario.

9. The method of claim 1, wherein the multiple sensor signals include sensor signals being indicative of at least one of: wind speed, wind direction, ambient temperature, wind turbine generator temperature, wind turbine drive train temperature, wind turbine hydraulic system temperature, blade position, grid voltage, number of cable twists, output power, nacelle temperature, thermo relay error, loads on tower, tower vibrations, rotor speed, pitch angle, loads in blades, cooling capacity, oil pressure, and generator current.

10. The method of claim 1, wherein the safe mode comprises at least one of: operating the wind turbine at reduced power output, performing a sensor fault analysis, performing an untwist-cable operation, performing a cooling operation, monitoring the second sensor signal for detecting whether a threshold value is exceeded.

11. The method of claim 1, further comprising:
upon determining that the alarm condition is met, generating an alarm signal indicating which of the plurality of different predetermined alarm scenarios corresponds to the alarm condition.

12. A wind turbine, comprising:
a tower,
a nacelle,
a rotor with at least one blade, and
a control arranged to control the operation of a wind turbine, wherein the control includes a memory for storing a plurality of predefined alarm scenarios; and
wherein the control is coupled to multiple sensors which are arranged to output sensor signals being indicative of the state of at least said wind turbine;
wherein the control is further arranged to analyze at least a first one of the multiple sensor signals in order to determine whether a specific alarm condition defined in one of the plurality of different predefined alarm scenarios is met; and upon determining that the alarm condition is met, to fault check the first sensor signal using at least a second one of the multiple sensor signals and a fault checking technique defined in the alarm scenario corresponding to the specific alarm condition to determine whether the wind turbine is to be put into one of: a predefined safe mode, a shutdown mode or a continued operation mode.

13. The wind turbine of claim 12, wherein the multiple sensors include at least one of: wind speed sensor, nacelle temperature sensor, blade position sensor, tower vibration sensor, hydraulic oil temperature sensor, ambient temperature sensor, generator temperature sensor, rotor speed sensor, wind direction sensor, generator voltage sensor, cable twist sensor, drive train temperature sensor, loads on tower sensor, cooling capacity sensor, oil pressure sensor, and generator current sensor.

14. The wind turbine of claim 12, wherein the second sensor signal is different from the first sensor signal used to determine that the alarm condition is met.

15. The wind turbine of claim 12, wherein the fault checking technique, when executed, identifies whether a sensor outputting the first sensor signal is faulty.

16. The wind turbine of claim 12, wherein the fault checking technique comprising simulating a theoretical state of the wind turbine based on the second sensor signal.

17. The wind turbine of claim 16, wherein the control is further arranged to control the wind turbine in the safe mode based on the simulated theoretical state of the wind turbine.

18. The wind turbine of claim 12, wherein the safe mode is defined in the alarm scenario corresponding to the alarm condition.

19. The wind turbine of claim 12, wherein the predefined alarm scenarios each includes a respective alarm condition, a respective fault checking technique, information for determining whether the wind turbine shall be put into the safe mode, the shutdown mode or the continued operation mode, and information defining how the safe mode is to be performed on the wind turbine.

20. The wind turbine of claim 12, wherein the multiple predefined alarm scenarios include at least one of: high ambient temperature of the wind turbine, high temperature on the wind turbine generator, high temperature on the wind turbine drive train, stop on high wind speed, wind turbine blade pitch deviation error, error on all wind sensors of the wind turbine, wind turbine blade pitch position error, and high temperature on a wind turbine hydraulic system alarm scenario.

21. The wind turbine of claim 12, wherein the multiple sensor signals include sensor signals being indicative of at least one of: wind speed, wind direction, ambient temperature, wind turbine generator temperature, wind turbine drive train temperature, wind turbine hydraulic system temperature, blade position, grid voltage, number of cable twists, output power, nacelle temperature, thermo relay error, loads on tower, tower vibrations, rotor speed, pitch angle, loads in blades, cooling capacity, oil pressure, and generator current.

22. The wind turbine of claim 12, wherein the safe mode comprises at least one of: operating the wind turbine at reduced power output, performing a sensor fault analysis, performing an untwist-cable operation, performing a cooling operation, monitoring the second sensor signal for detecting whether a threshold value is exceeded.

23. The wind turbine of claim 12, wherein a alarm signal is generated indicating which of the plurality of predefined alarm scenarios corresponds to the alarm condition.

* * * * *